United States Patent
Arvidson et al.

(10) Patent No.: US 12,317,167 B2
(45) Date of Patent: May 27, 2025

(54) METHOD OF, AND A NODE DEVICE FOR, SUPPORTING ESTABLISHMENT OF A PATH FROM A SOURCE NODE TO A DESTINATION NODE IN WIRELESS MESH NETWORK

(71) Applicant: Telefonaktiebolaget LM Ericsson (publ), Stockholm (SE)

(72) Inventors: Pontus Arvidson, Sollentuna (SE); Per Skillermark, Årsta (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 705 days.

(21) Appl. No.: 17/285,525

(22) PCT Filed: Dec. 14, 2018

(86) PCT No.: PCT/EP2018/084987
§ 371 (c)(1),
(2) Date: Apr. 15, 2021

(87) PCT Pub. No.: WO2020/119922
PCT Pub. Date: Jun. 18, 2020

(65) Prior Publication Data
US 2021/0392564 A1   Dec. 16, 2021

(51) Int. Cl.
*H04W 40/22* (2009.01)
*H04W 40/02* (2009.01)
(Continued)

(52) U.S. Cl.
CPC ........... *H04W 40/22* (2013.01); *H04W 40/02* (2013.01); *H04W 40/30* (2013.01); *H02J 13/00026* (2020.01); *H04B 2201/00* (2013.01)

(58) Field of Classification Search
CPC ..... H04W 40/22; H04W 40/02; H04W 40/30; H02J 13/00026; H04B 2201/00
See application file for complete search history.

(56) References Cited

U.S. PATENT DOCUMENTS 8,824,274 B1 * 9/2014 Medved .................. H04L 47/20
370/217
2008/0298304 A1   12/2008 Yagyu et al.
(Continued)

FOREIGN PATENT DOCUMENTS

WO   2011131688 A1   10/2011

OTHER PUBLICATIONS

Henry, Jerome. "802.11s Mesh Networking v1.0—Certified Wireless Network Administrator." CWNP, Nov. 2011, www.cwnp.com/uploads/802-11s_mesh_networking_v1-0.pdf.*
(Continued)

*Primary Examiner* — Michael J Moore, Jr.
(74) *Attorney, Agent, or Firm* — Leffler Intellectual Property Law, PLLC

(57) ABSTRACT

A method of supporting establishment of a path from a source node to a destination node in wireless mesh network, said path comprising at least one intermediate node, said method comprising the steps of receiving, by an intermediate node, a synchronous notification message, from a neighbouring node, for synchronizing said intermediary node with said neighbouring node, and establishing, by said intermediate node, in response to said receipt of said synchronous notification message, a reciprocal path between said intermediate node and said neighbouring node, wherein said reciprocal path is used in a path between said source node and said destination node. A corresponding node device arranged for performing the method is also presented herein.

10 Claims, 3 Drawing Sheets

(51) Int. Cl.
*H04W 40/30* (2009.01)
*H02J 13/00* (2006.01)

(56) References Cited

U.S. PATENT DOCUMENTS

2016/0373997 A1* 12/2016 Petersen ............... H04L 45/247
2019/0141645 A1* 5/2019 Abouelseoud ........ H04W 76/14
2021/0392564 A1* 12/2021 Arvidson ............. H04W 40/22

OTHER PUBLICATIONS

Henry, Jerome. "802.11s Mesh Networking v1.0—Certified Wireless Network Administrator." CWNP, Nov. 2011, www.cwnp.com/uploads/802-11s_mesh_networking_v1-0.pdf. (Year: 2011).*
PCT International Search Report, mailed Aug. 2, 2019, in connection with International Application No. PCT/EP2018/084987, all pages.
PCT Written Opinion, mailed Aug. 2, 2019, in connection with International Application No. PCT/EP2018/084987, all pages.

* cited by examiner

METHOD OF, AND A NODE DEVICE FOR, SUPPORTING ESTABLISHMENT OF A PATH FROM A SOURCE NODE TO A DESTINATION NODE IN WIRELESS MESH NETWORK

TECHNICAL FIELD

The present disclosure generally relates to the field of wireless mesh networks, and more specifically to a method of establishing a path between a source node and a destination node in a wireless mesh network.

BACKGROUND

Wireless Mesh Networks, WMNs, Wireless Personal Area Networks, WPANs, or in general communication networks comprised of a plurality of communicatively interconnected devices, generally comprise multiple network end nodes, network relay nodes, such as bridges, switches and other electric infrastructure devices and equipment. These node devices are generally controlled by at least one network control or coordinator device, which may provide access to other networks and the Internet, for example. Such a network control or coordinator device is also called a gateway device.

Examples of such communication devices are Customer-Premises Equipment, CPE, for example lighting devices having communication capabilities, Internet of Things, IoT, devices, and User Equipment, UE, for mobile telephone and data communication. Network protocols for exchanging data by networked devices or nodes are generally available and known as ZigBee™, Bluetooth™, as well as Wi-Fi based protocols for wireless networks, and wired bus networks such as DALI™ (Digital Addressable Lighting Interface), DSI (Digital Serial Interface), DMX (Digital Multiplex), and KNX (based systems).

Bluetooth Low Energy, BLE, Mesh is an addition to Bluetooth® specifications that allows for multi-hop communication between BLE devices to be able to address new use cases mainly in the Internet of Things, IoT, area. The first release of the BLE mesh specifications was released in July 2017 and uses flooding to propagate messages through the mesh network. This means that any designated relay node will relay ant received message towards all other nodes within hearing distance. This version of the BLE mesh specification uses the same advertising bearer as defined in version 4.0 of the Bluetooth specification, for all transmissions. This means that out of the 40 channels used by Bluetooth, BLE mesh only uses 3.

Directed Forwarding, DF, is a new feature for BLE mesh set to be released in 2019. With the introduction of DF, messages will no longer be flooded in the network. Instead, paths through the network allowing only the relay nodes relevant to the get the message across to the destination node perform relay transmissions.

The paths are created by letting a path originator or a source node, flood a Path Request, PREQ, message through the network. When the PREQ message is received by the path destination, the destination chooses a best path, according to some metric, usually based on the hop count or Received Signal Strength Indicator, RSSI, and replies back with a Path Reply, PREP, message. The PREP message is unicast along the chosen path towards the originator.

Once the path originator receives the PREP message, the path is considered to be established and the established path will be used for subsequent data transmissions between the source node and the destination node. By only allowing relays that are part of the path to relay messages, the congestion of the physical channels is greatly reduced leading to fewer on-air collisions and, in turn, a higher capacity of the network.

Periodic Advertising, PA, was introduced to the Bluetooth with the advertising extensions feature, which was released as part of the Bluetooth 5 specification, released in 2017. With PA, the advertiser transmits a periodic frequency hopping train of transmissions on the 37 BLE data channels. Occasionally, it will also perform beacon transmissions on the advertising channels, containing information of how much are resources are used for the data channel transmissions.

This allows a node that is scanning the advertising channels to discover and synchronize to the transmissions on the data channels. While periodic advertising is not yet utilized by BLE mesh, it is considered to be the most likely bearer for future releases of the mesh specifications as it will allow for both better spectrum utilization as well as better energy performance.

When using the PA bearer for BLE mesh, it is envisioned that the relay nodes in the network use PA for their transmissions while the end nodes—viz. the source node and the destination node, use regular advertising transmissions, as defined in previous versions of the Bluetooth specification. This allows end nodes to conserve energy while also improving the spectral efficiency of the entire network by letting the relay nodes utilize the full BLE spectrum. The relay nodes may synchronize to the PA transmissions of all nearby relays, while the end nodes will most likely synchronize to one, or a few of the nearest relays.

Due to hardware and software limitations, there will always exist an upper limit to the number of other PA relays that one PA relay may be simultaneously synchronized to. This means that there is always a risk of links in the network to be asymmetrical, i.e., a message being transmitted from a node A to another node B, may not be able to traverse the same path through the network, as when being transmitted from B to A.

Furthermore, while the choice of using different bearers for different transmissions has some advantages in terms of energy consumption and resource utilization, this also introduces risk of asymmetrical, or non-reciprocal links in the network. These asymmetrical links, in turn, produce an issue for the BLE mesh DF feature, as a reciprocal path is a prerequisite to be able to establish a path between two nodes.

SUMMARY

An object of the present disclosure is to ensure the establishment of a reliable path between a source node and a destination node in a wireless mesh network that employs the periodic advertising bearer and the directed forwarding feature.

In a first aspect of the present disclosure, there is presented a method of supporting establishment of a path from a source node to a destination node in wireless mesh network, the path comprising at least one intermediate node. The method comprising the steps of receiving, by an intermediate node, a synchronous notification message, from a neighbouring node, for synchronizing the intermediary node with the neighbouring node, and establishing, by the intermediate node, in response to the receipt of the synchronous notification message, a reciprocal path between the intermediate node and the neighbouring node, wherein the reciprocal path is used in a path between the source node and the destination node.

The present disclosure relates to selecting a path between a source node and a destination node, in a wireless mesh network, as being the preferred path for all future transmissions between the source and destination node pair. Currently messages are transmitted by what is known as flooding wherein messages arrive at the destination node by repeated transmissions by every node in the network. The forwarding of messages only across a selected path is known as Direct Forwarding. In order to ensure that a path is available for forwarding in both directions, i.e. from the source node to the destination node and from the destination node to the source node, it may be beneficial to ensure reciprocity of the path before selecting a path.

Therefore, it was the insight of the inventors, to establish a reciprocal path between a pair of nodes—viz. the intermediate node and the neighbouring node. Such a reciprocal path is established by means of an upper transport layer control message. Such a message is referred to as Synchronous Notification, SN, message within the scope of the present disclosure. When a node enters synchronization, it shall perform a unicast transmission of a SN message towards the node whose transmissions it has synchronized to.

The SN message may comprise the necessary synchronization information and an identifier of the node which sent out the message. Upon receipt of such an SN message, the intermediate node shall establish a reciprocal path between the two nodes. It was the insight of the inventors that a path between a source node and destination node that traverses such an intermediate node will be more reliable in both directions due to the establishment of such a reciprocal path. Furthermore it may understood by the skilled person that a node, such as the intermediate node, that receives SN messages from its neighbouring nodes may store such information locally. In other words, the intermediate node may keep a track of all the SN messages received by it.

The skilled person understands that synchronization may become necessary when the intermediate node uses a Periodic Advertising, PA, bearer. Bluetooth Low Energy uses 40 different frequency channels (PHY channels), separated by 2 MHz. Three of these channels are called Primary Advertisement channels, while the remaining 37 channels are used for Secondary Advertisements as well as Data channels for transfers during a connection. Advertisements are used by devices to broadcast data and info for other observer devices to discover and process. It allows the device to broadcast this information for multiple devices to discover without a connection between the observers and broadcaster.

Advertisements always start with advertisement packets sent on the 3 primary channels (or a subset of these channels). Extra information can then be offloaded to the Secondary advertisement channels to allow for more data to be broadcast. There's also an additional mode called Periodic Advertisement that allows a scanner or observer to be synchronized with the advertisements sent continuously by the broadcaster.

Periodic Advertising may be used for broadcasting packets to devices at a set period between two unconnected devices, meaning that more than one device can listen and tune in on these periodic advertisements. They consist of advertisements sent at a fixed interval with the advertisement data changing from time to time.

According to an example, the method further comprises the steps of receiving, by the intermediate node, a path request message, from the neighbouring node, in order to setup a path from a source node to a destination node; determining, by the intermediate node, that the reciprocal path has been established between the intermediate node and the neighbouring node, and forwarding, by the intermediate node, the path request message, towards the destination node, thereby supporting establishment of the path between the source node and the destination node.

It was the insight of the inventors to exploit the reliability of an established reciprocal path between a pair of nodes by including the reciprocal path in a path between a source node and a destination node. It is known that a path may be established by means of flooding the network with a Path Request, PREQ, message. According to the present disclosure, when a node receives a path request message from a neighbouring node, it checks whether an SN message has been received previously from the same node. In other words, the intermediate node evaluates whether a reciprocal path has been established between the intermediate node and the neighbouring node. Only if an SN message has been previously received from a particular neighbouring node, the intermediate node processes a subsequently received PREQ message received from the same neighbouring node.

In an embodiment, the step of establishing comprises establishing, by the intermediate node, the reciprocal path between the intermediary node and the neighbouring node for a predetermined amount of time.

To adapt to topology changes, for example caused by node mobility or node failures, nodes may assume that the reception of a SN message implies that the link is bi-directional for a given time. If the SN lifetime expires without any additional SN message has been received, the node may assume that the link is no longer bi-directional.

Preferably the predetermined amount of time is included in the synchronous notification message. Such a time for a bidirectional, or reciprocal, link is to be maintained may be defined as a standard for an entire system, or alternately may be specified in the SN message received by the intermediate node.

According to an embodiment, the method further comprises the step of transmitting, by the intermediary node, to the neighbouring node, an acknowledgement synchronous notification message in response to the received synchronous notification message for acknowledging synchronization of the intermediary node with the neighbouring node. This may imply that nodes, such as an intermediate node, that are synchronized to the PA bearer of neighbouring nodes must regularly send a SN message to the transmitting node, to assure that the link over time is considered to be bi-directional also from the perspective of the transmitting node.

In an example, the synchronous notification message is received, by the intermediate node, over a periodic advertising bearer. When one PA node synchronizes to another, it is highly unlikely that the second node synchronizes to the first one at the exact same time. Hence, if the first node entering synchronization transmits its SN message directly on the PA bearer, it is likely the message will not be received by the second node.

One way to ensure that the SN message reaches its destination is to choose to transmit it using a bearer that it is known that the receiver is listening to. More specifically, this would mean transmitting the message directly on the BLE advertising channels, using regular advertising, or transmitting it using the regular extended advertising. As the PA relay nodes scan the advertising channels when not busy transmitting or receiving periodic advertising, it may be assumed that it should be reachable over the advertising channels.

A second approach to ensure successful reception of the SN message is to let the receiving node acknowledge an incoming SN message by transmitting one back. Both transmissions being carried over the PA bearer.

Optionally, the first node that performs the synchronization, to a second node, may choose to delay its transmission of the SN message to allow for the second node to synchronize to the transmissions of the first, and thus decreasing the risk of having to re-transmit the message in order to get it across.

The method according to the present disclosure allows a BLE mesh network to use the BLE Periodic Advertising Bearer together with the BLE Mesh Directed Forwarding feature by notifying relays of synchronization as well as performing filtering of path setup messages. The main advantage of such methods disclosed herein is that it allows a BLE mesh network to get the gains from both using the PA bearer and the DF feature at the same time. In terms of network performance this will increase the system capacity, both in terms of number of nodes in the network and system throughput, as well as increase the end-to-end reliability of messages in the network.

In a second aspect of the present disclosure, there is presented an intermediate node in a wireless mesh network arranged for supporting establishment of a path from a source node to a destination node in the wireless mesh network, the path comprising at least the intermediate node. The intermediate node comprises receive equipment arranged for receiving a synchronous notification message, from a neighbouring node, for synchronizing the intermediary node with the neighbouring node, and process equipment arranged for establishing, in response to the receipt of the synchronous notification message, a reciprocal path between the intermediate node and the neighbouring node, wherein the reciprocal path is used in the path between the source node and the destination node.

It is hereby noted that the advantages and definitions of the first aspect of the present disclosure, being the method for supporting the establishment of a path in a wireless mesh network, are also associated with the second aspect of the present disclosure, being the intermediate node device that is arranged to supporting establishment of a path in a wireless mesh network.

The skilled person understands that each of the nodes in a mesh network may or may not be identical. Furthermore, any node in the network may be a source or a destination node. Similarly, any node that is not an intended destination node or a source node of a particular transmission may be an intermediate node. A node that acts as an intermediate node for one transmission may be, for example, the source node for another transmission. Furthermore, within the scope of the present disclosure, a neighbouring node is defined as a node that is within a distance of one hop from a particular node.

According to an example of the second aspect of the present disclosure, the receive equipment is further arranged for receiving a path request message, from the neighbouring node, in order to setup a path from the source node to the destination node, the process equipment is further arranged for determining that the reciprocal path has been established between the intermediate node and the neighbouring node.

The intermediate node further comprises transmit equipment arranged for forwarding the path request message, towards the destination node, thereby supporting establishment of the path between the source node and the destination node.

In an example of the second aspect of the disclosure, the process equipment is further arranged to maintain the established reciprocal path between the intermediary node and the neighbouring node for a predetermined amount of time.

According to an embodiment of the second aspect, the process equipment is further arranged to extract the predetermined amount of time from the received synchronous notification message.

In an exemplary embodiment of the second aspect, the transmit equipment is further arrange for transmitting to the neighbouring node, an acknowledgement synchronous notification message in response to the received synchronous notification message, wherein the acknowledgement synchronous notification message is arranged to acknowledge synchronization of the intermediary node with the neighbouring node.

In a third aspect of the present disclosure, there is presented a computer readable storage medium comprising computer readable instructions, which when loaded on to a computer of a node device arranged for operating in a network of communicatively interconnected node devices performs the method according to any of the methods described in the first aspect of the present disclosure.

These and other aspects of the disclosure will be apparent from and elucidated with reference to the embodiments described hereinafter.

DETAILED DESCRIPTION

Figure 1:
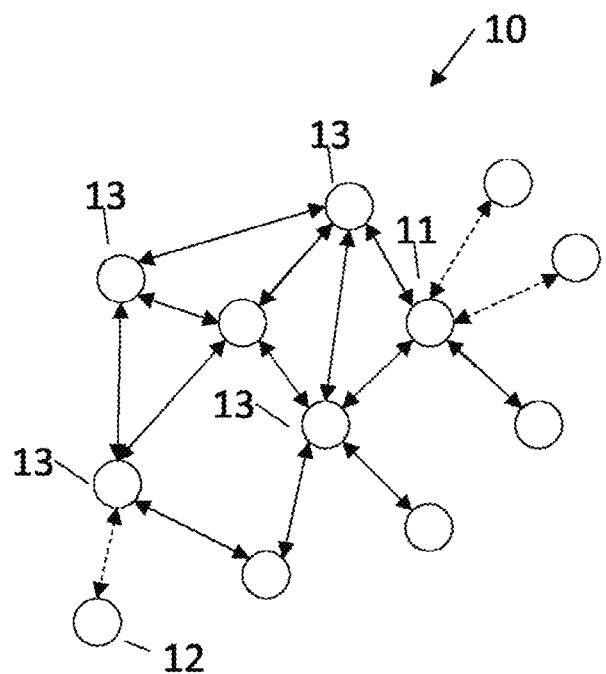
FIG. 1 schematically illustrates a mesh network.

FIG. 1, by way of example, schematically illustrates a mesh network 10, for example a Bluetooth Low Energy, BLE, mesh network. The mesh network comprises a plurality of node devices 11, 12, 13. According to established standards, the nodes 11, 12, 13 communicate with one another by means of messages that are propagated in the network by means of flooding. Such messages usually originate at a source node 11, and are intended to be received by one or more destination nodes 12.

The source node 11 broadcasts the intended message to all its neighbouring nodes. The intermediate nodes 13 that receive the message further propagates the message in the network 10 by forwarding the received messages. The message finally arrives at the intended destination node 12 by the forwarding of the message by the intermediate nodes 13. Such a process is known to the skilled person as flooding. The process is often slow and there is an increased probability of loss of messages as a result of on air collisions. Consequently, there is proposed to setup a direct path between a source node 11 and destination node 12, such that messages originating at the source node 11 and directed towards destination node 12 traverse only set of intermediate nodes and are not flooded in the entire network.

The skilled person understands that each of the node 11, 12, 13 may or may not be identical. Furthermore, any node in the network may be a source or a destination node. Similarly, any node that is not an intended destination node or a source node of a particular transmission may be an intermediate node. A node that acts as an intermediate node for one transmission may be, for example, the source node for another transmission. Furthermore, within the scope of the present disclosure, a neighbouring node is defined as a node that is within a distance of one hop from a particular node.

Figure 2:
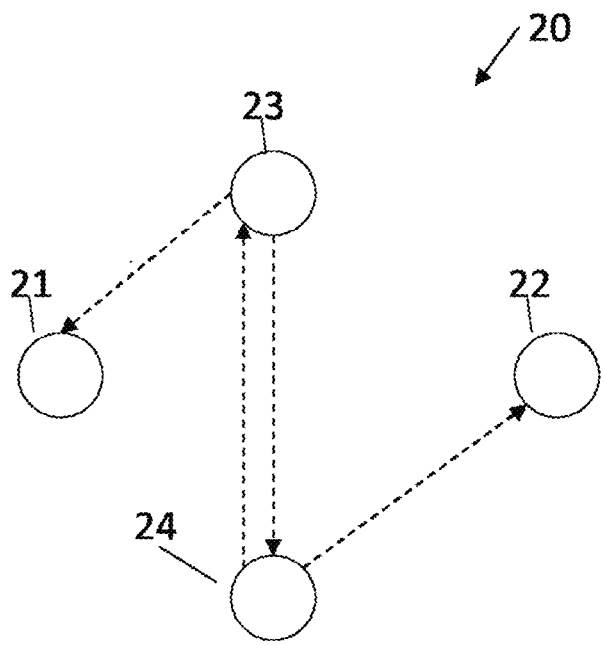
FIG. 2 schematically illustrates a mesh network employing a method according to the present disclosure.

FIG. 2 schematically illustrates a mesh network 20 employing a method according to the present disclosure. In FIG. 2, a simplistic scenario with a source node, 21, a destination node, 22, and two Periodic Advertising, PA, relay nodes, 23 and 24, is shown. Relay nodes 23 and 24 are within radio coverage of each other as well as both source node 21 and destination node 22. Source node 21 and Destination node 22 are not within coverage of each other and thus need to relay their messages through relay node 23 and/or relay node 24.

When intermediate node 23 and intermediate node 24 receive a Path Request, PREQ, message from the source node 21, intermediate node 23 shall process the received message while intermediate node 24 discards it. By eliminating the link between source node 21 and intermediate node 24, from the path discovery procedure, it is made certain that only paths that work in both directions are considered when creating the path between the source node 21 and the destination node 22.

Figure 3:
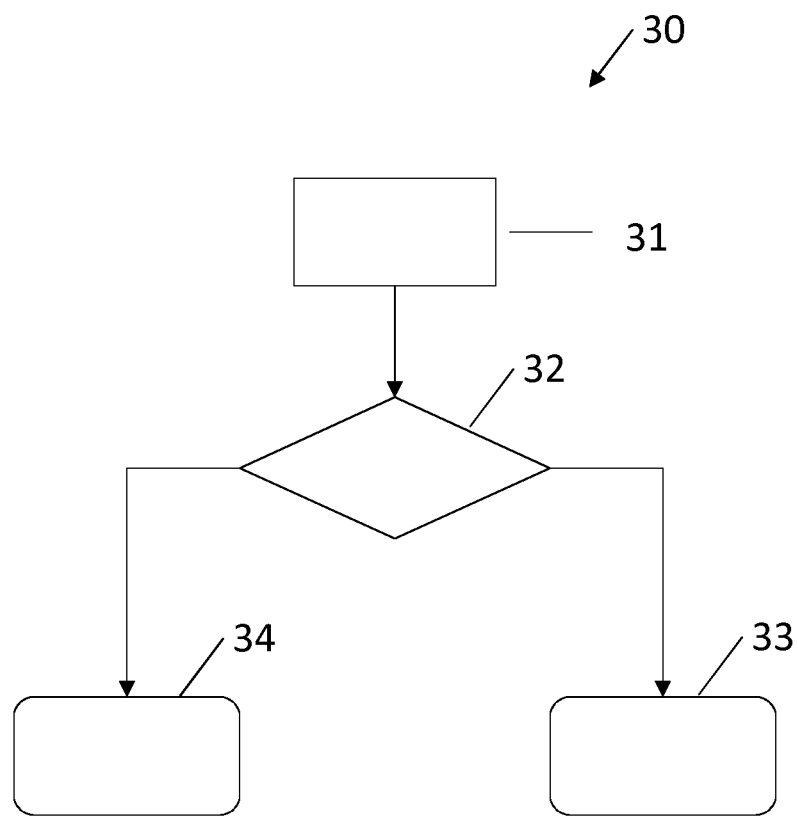
FIG. 3 schematically illustrates a method according to the present disclosure.

FIG. 3 schematically illustrates a method 30 according to the present disclosure. A first node, such as a neighbouring node, that synchronizes to the PA transmissions of second node, such as an intermediate node, shall notify the second node that it is now synchronized to its train of transmissions. This notification may be introduced as a BLE Mesh upper transport layer control message, hereby referred to as Synchronous Notification, SN, message. When a node enters synchronization, it shall perform a unicast transmission of an SN message towards the node whose transmissions it has synchronized to. A PA relay node shall store information of which nodes it has received the SN messages from. When the PA relay node receives 31 a PREQ message, it shall process the message only if the sender is among the set of nodes synchronized to its transmissions.

At step 32, it is evaluated, if an SN message has been received previously from the sender. If an SN message has not yet been received from the sender, the PREQ message is discarded 34. If upon evaluation, it appears that the node has received previously, an SN message from the sender, the PREQ message is propagated further 33 in the network, thereby including the two nodes, and the link between the nodes as a possible link in the path between the source node and the destination node.

By letting the PA relay node filter out messages, by discarding 34, from nodes that are not synchronized to its transmissions, it is ensured that any path that is being discovered by propagation of the PREQ message can be followed back when transmitting Path Reply, PREP, messages back to the path originator to establish the path.

Figure 4:
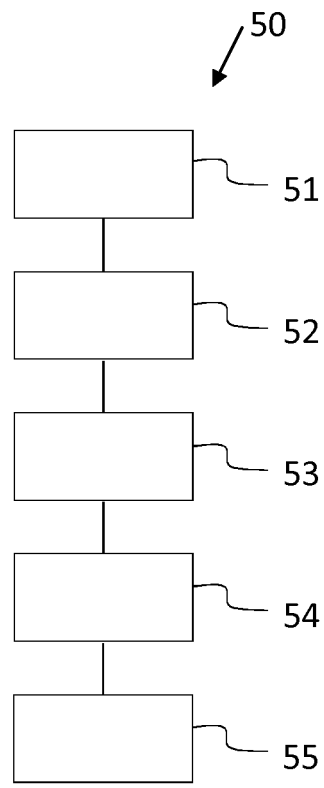
FIG. 4 schematically illustrates a method for supporting establishment of a path in mesh network according to the present disclosure.

FIG. 4 schematically illustrates a method 50 for supporting establishment of a path in mesh network according to the present disclosure. The method comprises the steps of receiving, by an intermediate node, a synchronous notification message 51, from a neighbouring node, for synchronizing the intermediary node with the neighbouring node, and establishing 52, by the intermediate node, in response to the receipt of the synchronous notification message, a reciprocal path between the intermediate node and the neighbouring node, wherein the reciprocal path is used in a path between the source node and the destination node.

According to an example, the method further comprises the steps of receiving, by the intermediate node, a path request message 53, from the neighbouring node, in order to setup a path from a source node to a destination node; determining 54, by the intermediate node, that the reciprocal path has been established between the intermediate node and the neighbouring node, and forwarding 55, by the intermediate node, the path request message, towards the destination node, thereby supporting establishment of the path between the source node and the destination node.

Figure 5:
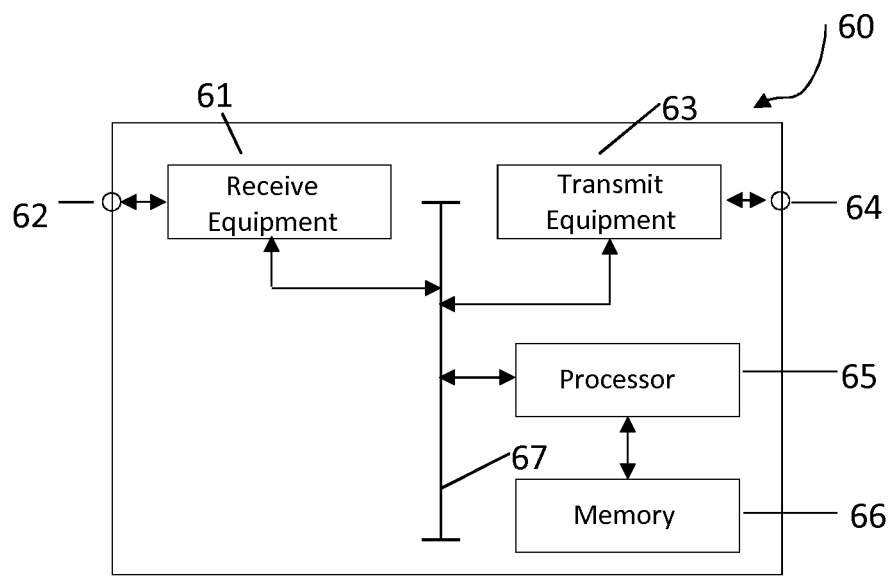
FIG. 5 schematically illustrates a node device according to the present disclosure.

FIG. 5 schematically illustrates a node device 60 according to the present disclosure. The intermediate node comprises receive equipment 61, 62 arranged for receiving a synchronous notification message, from a neighbouring node, for synchronizing the intermediary node with the neighbouring node, and process equipment 65 arranged for establishing, in response to the receipt of the synchronous notification message, a reciprocal path between the intermediate node and the neighbouring node, wherein the reciprocal path is used in the path between the source node and the destination node.

The receive equipment 61, 62 may be further arranged for receiving a path request message, from the neighbouring node, in order to setup a path from the source node to the destination node, the process equipment 65 may be further arranged for determining that the reciprocal path has been established between the intermediate node and the neighbouring node.

The intermediate node may further comprise transmit equipment 63, 64 arranged for forwarding the path request message, towards the destination node, thereby supporting establishment of the path between the source node and the destination node. The skilled person understands that although the transmit equipment 63, 64 is mentioned here as an optional feature, a node in a wireless mesh network almost always has the necessary equipment for receiving and transmitting messages in the network. The intermediate node 60 further comprises a memory 66 which is arranged to store computer readable instructions which when executed by the processor 65 causes the node to perform a method as disclosed herein. Furthermore, all the internal components communicate with one another via an internal bus 67.

The skilled person understands that each of the nodes in a mesh network may or may not be identical. Furthermore, any node in the network may be a source or a destination node. Similarly, any node that is not an intended destination node or a source node of a particular transmission may be an intermediate node. A node that acts as an intermediate node for one transmission may be, for example, the source node for another transmission.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus, the commissioning and/or control device, a luminaire device, a lighting system, the method, and the computer program product of the above aspects may have similar and/or identical preferred embodiments, in particular, as defined in the dependent claims.

It shall be understood that a preferred embodiment of the invention can also be any combination of the dependent claims or above embodiments with the respective independent claim.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of supporting establishment of a path from a source node to a destination node in wireless mesh network, said path comprising at least one intermediate node, said method comprising the steps of:
   receiving, by an intermediate node of the at least one intermediate node, a synchronous notification message from a neighbouring node, for synchronizing said intermediate node with said neighbouring node, wherein the synchronous notification from said neighbouring node is a notification that said neighbouring node is now synchronized to transmissions from the first intermediate node;
   establishing, by said intermediate node, in response to said receipt of said synchronous notification message, a reciprocal path between said intermediate node and said neighbouring node;
   storing information about the neighboring node in a store of information of which nodes the intermediate node has received synchronous notification messages from;
   receiving, by said intermediate node, a path request message in order to set up said path from the source node to the destination node;
   determining from the store of information, by said first intermediate node, whether a reciprocal path has been established between said intermediate node and a sender of the path request message;
   in response to determining that the reciprocal path has been established between said intermediate node and the sender of the path request message, forwarding, by said intermediate node, said path request message, towards said destination node, thereby supporting establishment of said path between said source node and said destination node; and
   discarding the path request message in response to determining that the reciprocal path has not been established between said intermediate node and the sender of the path request message.

2. The method according to claim 1, wherein said step of establishing comprises:
   establishing, by said first intermediate node, said reciprocal path between said intermediate node and said each neighbouring node for a predetermined amount of time.

3. The method according to claim 2, wherein said predetermined amount of time is included in said synchronous notification message.

4. The method according to claim 1, further comprising the step of:
   transmitting, by said intermediate node, to said neighbouring node, an acknowledgement synchronous notification message in response to said received synchronous notification message for acknowledging synchronization of said intermediate node with said neighbouring node.

5. The method according to claim 1, wherein said synchronous notification message is received, by said intermediate node, over a periodic advertising bearer.

6. An intermediate node in a wireless mesh network arranged for supporting establishment of a path from a source node to a destination node in said wireless mesh network, said intermediate node comprising:
   a receiver that is configured for receiving a synchronous notification message, from a neighbouring node, for synchronizing said intermediate node with said neighbouring node, wherein the synchronous notification from said neighbouring node is a notification that said neighbouring node is now synchronized to transmissions from the intermediate node;
   a processor that is configured for establishing, in response to said receipt of said synchronous notification message, a reciprocal path between said intermediate node and said neighbouring node and for storing information about the neighboring node in a store of information of which nodes the intermediate node has received synchronous notification messages from,
   wherein:
   said receiver is further configured for receiving a path request message in order to set up a path from said source node to said destination node;
   said processor is further configured for determining from the store of information whether a reciprocal path has been established between said intermediate node and a sender of the path request message and for discarding the path request message if no reciprocal path has been established between said intermediate node and the sender of the path request message, and otherwise to cause a transmitter to forward said path request message towards said destination node, thereby supporting establishment of said path between said source node and said destination node; and
   wherein the intermediate node further comprises:
   the transmitter.

7. The intermediate node according to claim 6, wherein said processor is further configured to maintain said established reciprocal path between said intermediate node and said neighbouring node for a predetermined amount of time.

8. The intermediary intermediate node according to claim 7, wherein said processor is further configured to extract said predetermined amount of time from said received synchronous notification message.

9. The intermediate node according to claim 6, wherein said transmitter is further configured for transmitting, to said neighbouring node, an acknowledgement synchronous notification message in response to said received synchronous notification message, wherein said acknowledgement synchronous notification message is arranged to acknowledge synchronization of said intermediate node with said neighbouring node.

10. A non-transitory computer readable storage medium comprising computer readable instructions, which when loaded on to a computer of a node device arranged for operating in a network of communicatively interconnected node devices performs a method of supporting establishment of a path from a source node to a destination node in wireless mesh network, said path comprising at least one intermediate node, said method comprising the steps of:

receiving, by an intermediate node of the at least one intermediate node, a synchronous notification message from a neighbouring node, for synchronizing said intermediate node with said neighbouring node, wherein the synchronous notification from said neighbouring node is a notification that said neighbouring node is now synchronized to transmissions from the first intermediate node;

establishing, by said intermediate node, in response to said receipt of said synchronous notification message, a reciprocal path between said intermediate node and said neighbouring node;

storing information about the neighboring node in a store of information of which nodes the intermediate node has received synchronous notification messages from;

receiving, by said intermediate node, a path request message in order to set up said path from the source node to the destination node;

determining from the store of information, by said first intermediate node, whether a reciprocal path has been established between said intermediate node and a sender of the path request message;

in response to determining that the reciprocal path has been established between said intermediate node and the sender of the path request message, forwarding, by said intermediate node, said path request message, towards said destination node, thereby supporting establishment of said path between said source node and said destination node; and discarding the path request message in response to determining that the reciprocal path has not been established between said intermediate node and the sender of the path request message.

\* \* \* \* \*